United States Patent
Bai et al.

(10) Patent No.: US 9,049,091 B2
(45) Date of Patent: Jun. 2, 2015

(54) SYSTEM AND METHOD FOR IN-PHASE/QUADRATURE-PHASE (I/Q) TIME DELAY MEASUREMENT AND COMPENSATION

(75) Inventors: Ziquan Bai, Beijing (CN); Hongwei Kong, Beijing (CN); Ya Jing, Beijing (CN)

(73) Assignee: Keysight Technologies, Inc., Santa Rosa, CA (US)

( * ) Notice: Subject to any disclaimer, the term of this patent is extended or adjusted under 35 U.S.C. 154(b) by 2248 days.

(21) Appl. No.: 12/021,388

(22) Filed: Jan. 29, 2008

(65) Prior Publication Data

US 2009/0190705 A1    Jul. 30, 2009

(51) Int. Cl.
*H04L 27/00* (2006.01)
*H04L 27/38* (2006.01)

(52) U.S. Cl.
CPC .................................. *H04L 27/3863* (2013.01)

(58) Field of Classification Search
USPC .................................. 375/332, 298, 296, 347
See application file for complete search history.

(56) References Cited

U.S. PATENT DOCUMENTS

| | | | |
|---|---|---|---|
| 7,239,671 B2* | 7/2007 | Wood et al. | 375/296 |
| 7,646,834 B2* | 1/2010 | Friedman | 375/347 |
| 2006/0008030 A1* | 1/2006 | Luke et al. | 375/298 |

* cited by examiner

*Primary Examiner* — Jaison Joseph (57) ABSTRACT

A system for determining a time delay between an in-phase signal component and a quadrature-phase signal component includes an in-phase signal start time determination module coupled to an in-phase delay module, the in-phase signal start time determination module and the in-phase delay module configured to receive an in-phase signal component of a received signal. The in-phase signal start time determination module is configured to receive a reference signal. The system also includes a quadrature-phase signal start time determination module coupled to a quadrature-phase delay module, the quadrature-phase signal start time determination module and the quadrature-phase delay module configured to receive a quadrature-phase signal component of a received signal. The quadrature-phase signal start time determination module is configured to receive a reference signal, wherein the in-phase delay module is configured to develop an in-phase delay signal and the quadrature-phase delay module is configured to develop a quadrature-phase delay signal.

18 Claims, 8 Drawing Sheets

SYSTEM AND METHOD FOR IN-PHASE/QUADRATURE-PHASE (I/Q) TIME DELAY MEASUREMENT AND COMPENSATION

BACKGROUND

Many communications systems employ communication protocols in which data to be communicated is converted to a system that includes in-phase (I) and quadrature-phase (Q) components. The in-phase and the quadrature-phase components are shifted in phase by an angular amount, such as, for example, 90 degrees. The data signal is impressed on the in-phase and the quadrature-phase signal components by a transmitter and recovered by a receiver. One example of a communication system that employs in-phase and quadrature-phase components is what is referred to as a multiple input multiple output (MIMO) communication system that uses orthogonal frequency division multiplexing (OFDM) in a multiple-antenna arrangement and that complies with communication standard IEEE 802.11n.

In any communication system that uses in-phase and quadrature-phase signal components, the quality of the signal transmission is dependent upon the relationship between the in-phase and the quadrature-phase components. For example, differences in the time delay between the in-phase and the quadrature-phase components can result in serious performance degradation to communication systems if not well compensated. The differences in the time delay between the in-phase and the quadrature-phase components, also referred to as I/Q time delay, is caused, at least in part, due to the different transmission delay of the I and Q signals. The main culprits giving rise to I/Q time delay are different circuit length between the I and Q channels, channel fading, and phase noise, which are all inevitable in real communication systems.

Therefore, it would be desirable to have a way to determine and compensate the delay between the in-phase and the quadrature-phase components of a communication signal.

SUMMARY

An embodiment of a system for determining a time delay between an in-phase signal component and a quadrature-phase signal component includes an in-phase signal start time determination module coupled to an in-phase delay module. The in-phase signal start time determination module and the in-phase delay module are configured to receive an in-phase signal component of a received signal. The in-phase signal start time determination module is configured to receive a reference signal. The system also includes a quadrature-phase signal start time determination module coupled to a quadrature-phase delay module. The quadrature-phase signal start time determination module and the quadrature-phase delay module are configured to receive a quadrature-phase signal component of a received signal. The quadrature-phase signal start time determination module is configured to receive a reference signal. The in-phase signal start time determination module is configured to develop an in-phase start time signal and the quadrature-phase signal start time determination module is configured to develop a quadrature-phase start time signal, wherein the in-phase delay module develops an in-phase delay signal representative of a delay of the in-phase signal component of the received signal and wherein the quadrature-phase delay module develops a quadrature-phase delay signal representative of a delay of the quadrature-phase signal component of the received signal.

Other embodiments and methods of the invention will be discussed with reference to the figures and to the detailed description.

BRIEF DESCRIPTION OF THE FIGURES

The invention will be described by way of example, in the description of exemplary embodiments, with particular reference to the accompanying figures.

DETAILED DESCRIPTION

The system and method for in-phase/quadrature-phase (I/Q) time delay measurement and compensation can be implemented on a measurement instrument or can be implemented in a receiver of a communication device for compensating for the delay between an in-phase signal component and a quadrature-phase signal component, also referred to as I/Q time delay. As will be described below, the system and method for in-phase/quadrature-phase (I/Q) time delay measurement and compensation uses a stored preamble of a standard communication signal or use a unique test signal to perform the I/Q signal delay measurement. The system and method for in-phase/quadrature-phase (I/Q) time delay measurement and compensation are independent of system architecture and do not have any dependency on the structure of system. The delay of the in-phase and the quadrature-phase components of a received signal is obtained by comparing the received signal with a reference signal. The I/Q time delay is obtained from the difference between the delay of the in-phase and the quadrature-phase components.

Figure 1:
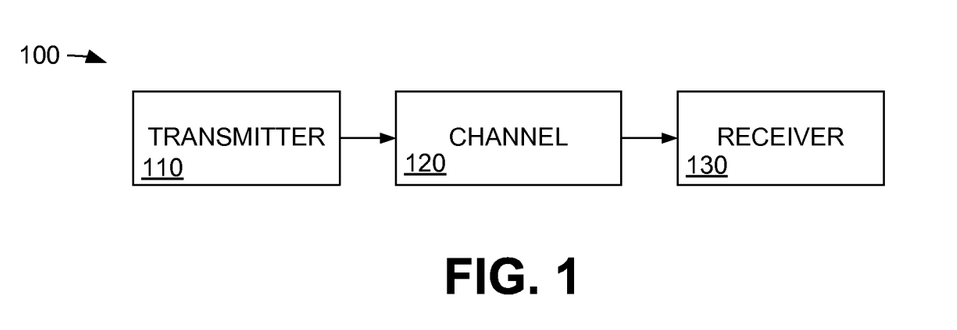
FIG. 1 is a schematic diagram illustrating a basic communication system.

FIG. 1 is a schematic diagram illustrating a basic communication system. The communication system includes a transmitter 110, a channel 120 and a receiver 130. The transmitter 110 can be any transmitter and can be located in, for example, a portable cellular communication device, a personal computer (PC), a personal digital assistant (PDA), a portable game player, a wireless local area network (LAN) device, or any other communication device. The receiver 130 can be any receiver adapted to receive the transmissions from the transmitter 110 and can be located in, for example, a portable cellular communication device, a personal computer (PC), a personal digital assistant (PDA), a portable game player, a wireless local area network (LAN) device, or any other communication device. Further, the transmitter 110 and the receiver 130 can be incorporated into a transceiver and the transceiver can communicate with another transceiver according to the principles described below. The channel 120 represents the transmission environment between the transmitter and the receiver, and can be any wired or wireless communication channel.

Figure 2:
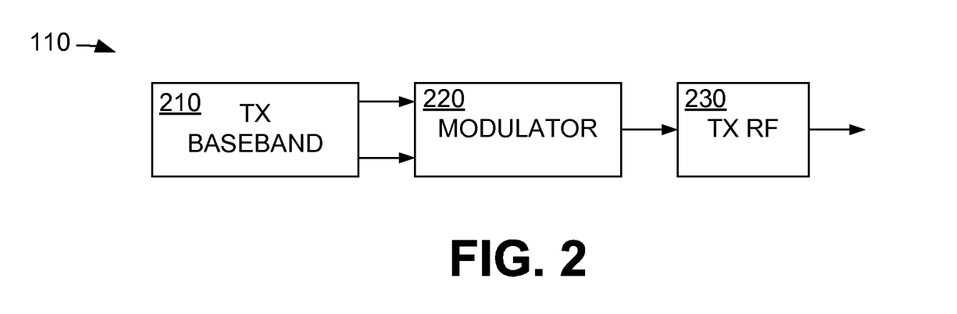
FIG. 2 is a schematic diagram illustrating the basic components of the transmitter of FIG. 1.

FIG. 2 is a schematic diagram illustrating the basic components of the transmitter 110 of FIG. 1. The transmitter 110 includes a transmit baseband module 210, a modulator 220 and a transmit radio frequency (RF) module 230. The transmit baseband module 210 performs baseband signal processing and provides a transmit signal to the modulator 220. In an embodiment, the transmit signal provided by the transmit baseband module 210 includes an in-phase component and a quadrature-phase component. The modulator 220 modulates the baseband signal and optionally upconverts the transmit signal to an intermediate frequency (IF) or to an RF signal level. The modulator provides the modulated signal to the transmit RF module 230. The transmit RF module 230 generally includes one or more amplification stages to amplify the modulated signal for transmission over the channel 120 (FIG. 1).

Figure 3:
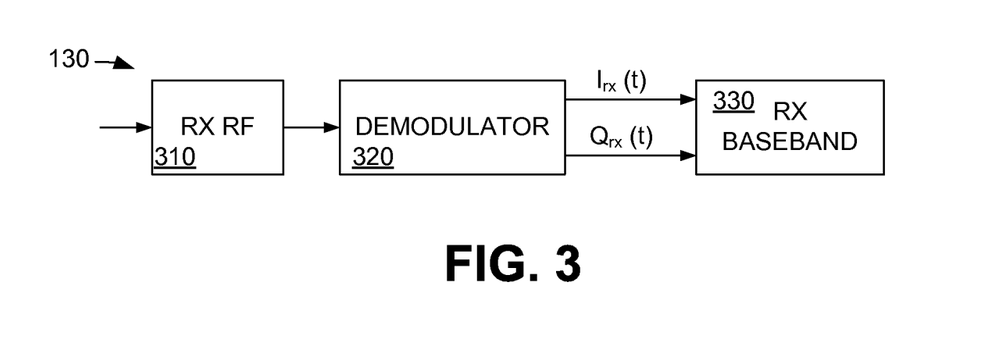
FIG. 3 is a schematic diagram illustrating the basic components of the receiver of FIG. 1.

FIG. 3 is a schematic diagram illustrating the basic components of the receiver 130 of FIG. 1. The receiver 130 includes a receive RF module 310, a demodulator 320 and a receive baseband module 330. The receive RF module 310 receives and filters the transmit signal received over the channel 120 (FIG. 1). The receive RF module 310 provides the received signal to the demodulator 320. The demodulator 320 demodulates the received signal to recover the information signal. The information signal includes an in-phase component, $I_{rx}(t)$ and a quadrature-phase component $Q_{rx}(t)$. The in-phase component, $I_{rx}(t)$ and the quadrature-phase component, $Q_{rx}(t)$, are provided to the receive baseband module 330 where the information contained in the in-phase component and the quadrature-phase component are recovered to baseband level. Time delay between the in-phase component and the quadrature-phase component mainly arises in the interface between the receive RF module 310 and the receive baseband module 330.

Figure 4:
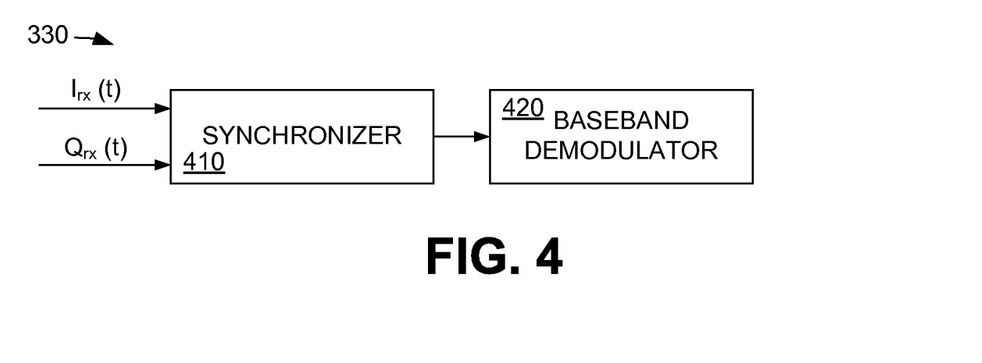
FIG. 4 is a schematic diagram illustrating a portion of the receive baseband module of FIG. 3.

FIG. 4 is a schematic diagram illustrating a portion of the receive baseband module 330 of FIG. 3. The receive baseband module 330 includes a synchronizer 410 and a baseband demodulator 420. The synchronizer 410 correlates the in-phase and the quadrature-phase components and provides a correlated receive signal to the baseband demodulator 420. The baseband demodulator 420 recovers the original transmit information.

Figure 5:
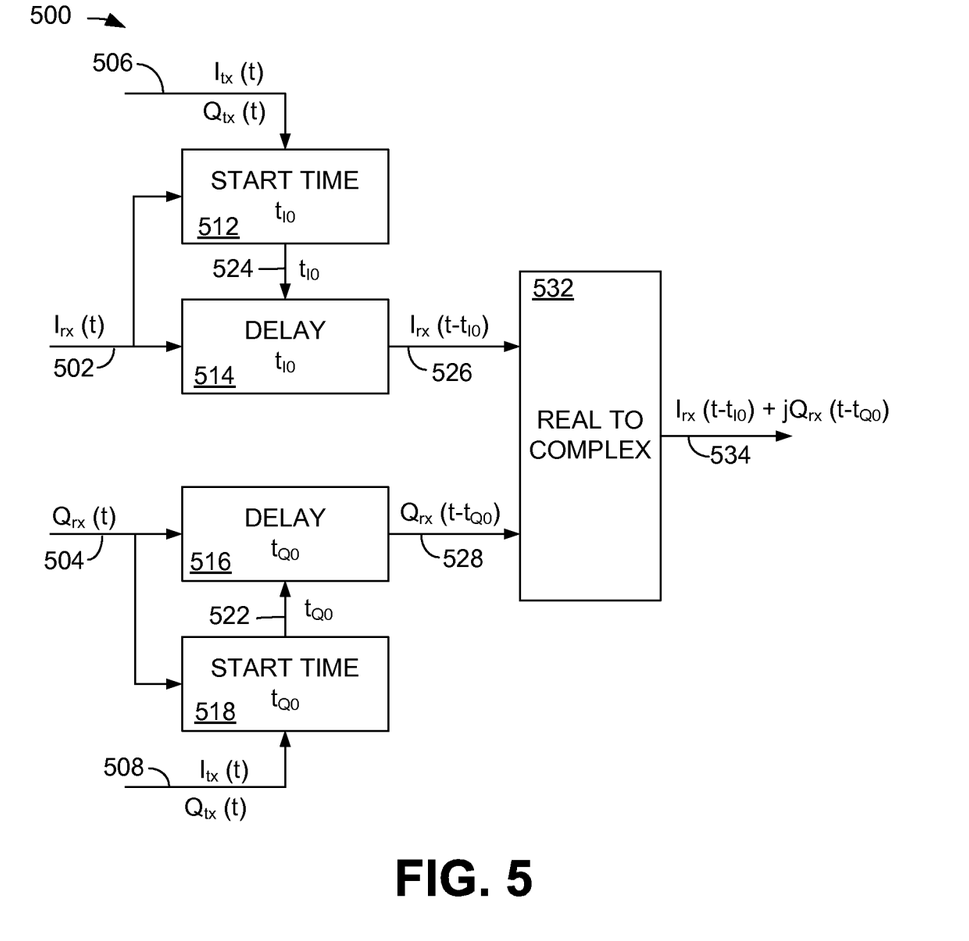
FIG. 5 is a schematic diagram illustrating an embodiment of the system and method for in-phase/quadrature-phase (I/Q) time delay measurement.

FIG. 5 is a schematic diagram illustrating an embodiment of the system and method for in-phase/quadrature-phase (I/Q) time delay measurement. In an embodiment, the system and method for in-phase/quadrature-phase (I/Q) time delay measurement can be implemented in a synchronizer, such as the synchronizer 410 of FIG. 4. The embodiment of the system and method for in-phase/quadrature-phase (I/Q) time delay measurement 500 shown in FIG. 5 is implemented in the synchronizer 410 of FIG. 4. However, other implementations and embodiments are possible.

The system and method for in-phase/quadrature-phase (I/Q) time delay measurement 500 includes a delay module 514 and a delay module 516. In this example, the delay module 514 operates on the in-phase component and the delay module 516 operates on the quadrature-phase component. However, this is arbitrary.

The in-phase component, $I_{rx}(t)$, of the receive signal is supplied via connection 502 to the delay module 514 and to a start time determination module 512. In accordance with an embodiment of the system and method for in-phase/quadrature-phase (I/Q) time delay measurement and compensation, a reference signal comprising an in-phase component, $I_{tx}(t)$ and a quadrature-phase component, $Q_{tx}(t)$, of the transmit signal is supplied to the start time determination module 512 via connection 506. The reference signal on connection 506 can be a preamble of the transmit signal stored in the baseband module 330 of the receiver 130, or can be a unique test signal. In an embodiment, the reference signal is a preamble of a communications message, where the preamble, and possibly other portions of the message, is defined by the applicable communication standard. In such an embodiment, the format of the reference signal is known at the receiver end. The reference signal can be stored in a memory associated with the transmitter 110 (FIG. 1) or can be generated in real-time. In an embodiment in which the reference signal is a unique test signal, the receiver 130 (FIG. 1) operates in test mode and the test signal would be defined for such test mode.

The output of the start time determination module 512 is a signal, $t_{I0}$, representing the start time of the in-phase component of the received signal, $I_{rx}(t)$. The signal, $t_{I0}$ is provided to the delay module 514 via connection 524. The delay module 514 delays the signal $I_{rx}(t)$ by the amount $t_{I0}$, and provides the output signal, $I_{rx}(t-t_{I0})$ on connection 526. The signal on connection 526 represents the receive signal, $I_{rx}(t)$ delayed by an amount of time corresponding to the actual start time of the reference signal $I_{tx}(t)$.

The quadrature-phase component, $Q_{rx}(t)$, of the receive signal is supplied via connection 504 to the delay module 516 and to a start time determination module 518. In accordance with an embodiment of the system and method for in-phase/quadrature-phase (I/Q) time delay measurement and compensation, a reference signal comprising an in-phase component, $I_{tx}(t)$ and a quadrature-phase component, $Q_{tx}(t)$, of the transmit signal is supplied to the start time determination module 518 via connection 508. The reference signal on connection 508 can be a preamble of the transmit signal stored in the baseband module 330 of the receiver 130, or can be a unique test signal, as described above.

The output of the start time determination module 518 is a signal, $t_{Q0}$, representing the start time of the quadrature-phase component of the received signal, $Q_{rx}(t)$. The signal, $t_{Q0}$ is provided to the delay module 516 via connection 522. The delay module 516 delays the signal $Q_{rx}(t)$ by the amount $t_{Q0}$, and provides the output signal, $Q_{rx}(t-t_{Q0})$ on connection 528. In an embodiment, the delay module 514 delays its output by one period time. The signal on connection 528 represents the receive signal, $Q_{rx}(t)$ delayed by an amount of time corresponding to the actual start time of the reference signal $Q_{tx}(t)$.

The signal, $I_{rx}(t-t_{I0})$ on connection 526 and the signal, $Q_{rx}(t-t_{Q0})$ on connection 528 are provided to a real-to-complex conversion module 532. The real-to-complex conversion module 532 converts the signals on connections 526 and 528 to a complex signal having the form $I_{rx}(t-t_{I0})+jQ_{rx}(t-t_{Q0})$ on connection 534.

In a traditional synchronizer, the start time of the in-phase and quadrature-phase signals is assumed to be the same and the delay between the I and Q signals cannot be measured. As described above, by using the reference signals $I_{tx}(t)$ and $Q_{tx}(t)$, the start times of the in-phase component and the quadrature-phase component are estimated separately and I/Q time delay can be obtained using the following equation.

$$t_{IQ} = t_{I0} - t_{Q0} \qquad \text{Eq. (1)}$$

Figure 6:
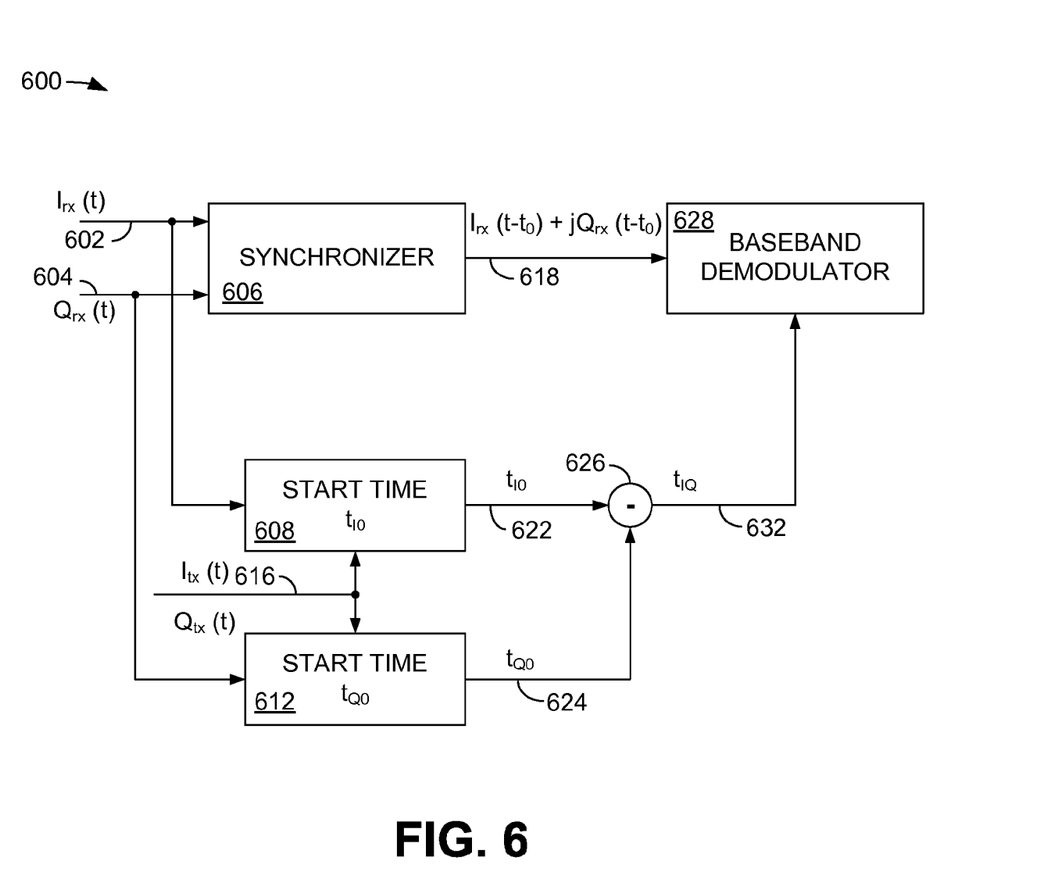
FIG. 6 is a schematic diagram illustrating an alternative embodiment of the system and method for in-phase/quadrature-phase (I/Q) time delay measurement.

FIG. 6 is a schematic diagram illustrating an alternative embodiment of the system and method for in-phase/quadrature-phase (I/Q) time delay measurement. In an embodiment, the system and method for in-phase/quadrature-phase (I/Q) time delay measurement can be implemented using a conventional synchronizer, such that the I/Q delay measurement results can be used for compensation of I/Q time delay in a baseband demodulator, such as the baseband demodulator 420 of FIG. 4. However, other implementations and embodiments are possible.

In the embodiment shown in FIG. 6, the in-phase component, $I_{rx}(t)$, of the receive signal is supplied to a synchronizer 606 via connection 602 and the quadrature-phase component, $Q_{rx}(t)$, of the receive signal is supplied to a synchronizer 606 via connection 604. The output of the synchronizer 606 is the complex term $I_{rx}(t-t_0) + jQ_{rx}(t-t_0)$. However, the term $I_{rx}(t-t_0) + jQ_{rx}(t-t_0)$ fails to account for any time delay between the in-phase component and the quadrature-phase component. The output of the synchronizer 606 is supplied via connection 618 to a baseband demodulator 628.

The in-phase component, $I_{rx}(t)$, of the receive signal is also supplied to a start time determination module 608 via connection 602 and the quadrature-phase component, $Q_{rx}(t)$, of the receive signal is supplied to a start time determination module 612 via connection 604. The start time determination module 608 is similar to the start time determination module 512 of FIG. 5 and the start time determination module 612 is similar to the start time determination module 518 of FIG. 5.

In accordance with an embodiment of the system and method for in-phase/quadrature-phase (I/Q) time delay measurement and compensation, a reference signal comprising an in-phase component, $I_{tx}(t)$ and a quadrature-phase component, $Q_{tx}(t)$, of the transmit signal is supplied to the start time determination module 608 and the start time determination module 612 via connection 616.

The output of the start time determination module 608 is a signal, $t_{I0}$, representing the start time of the in-phase component of the receive signal, $I_{rx}(t)$.

The output of the start time determination module 612 is a signal, $t_{Q0}$, representing the start time of the quadrature-phase component of the receive signal, $Q_{rx}(t)$. The signal $t_{I0}$ on connection 622 and the signal $t_{Q0}$ on connection 624 are supplied to a subtractor 626. The output of the subtractor 626 is a signal, $t_{IQ}$, representing the net delay of the in-phase and the quadrature-phase receive signals. The signal $t_{IQ}$ is supplied via connection 632 to the baseband demodulator 628. The signal $t_{IQ}$ is used to compensate for the I/Q signal delay by altering the term $I_{rx}(t-t_0) + jQ_{rx}(t-t_0)$ to account for I/Q signal delay.

Figure 7:
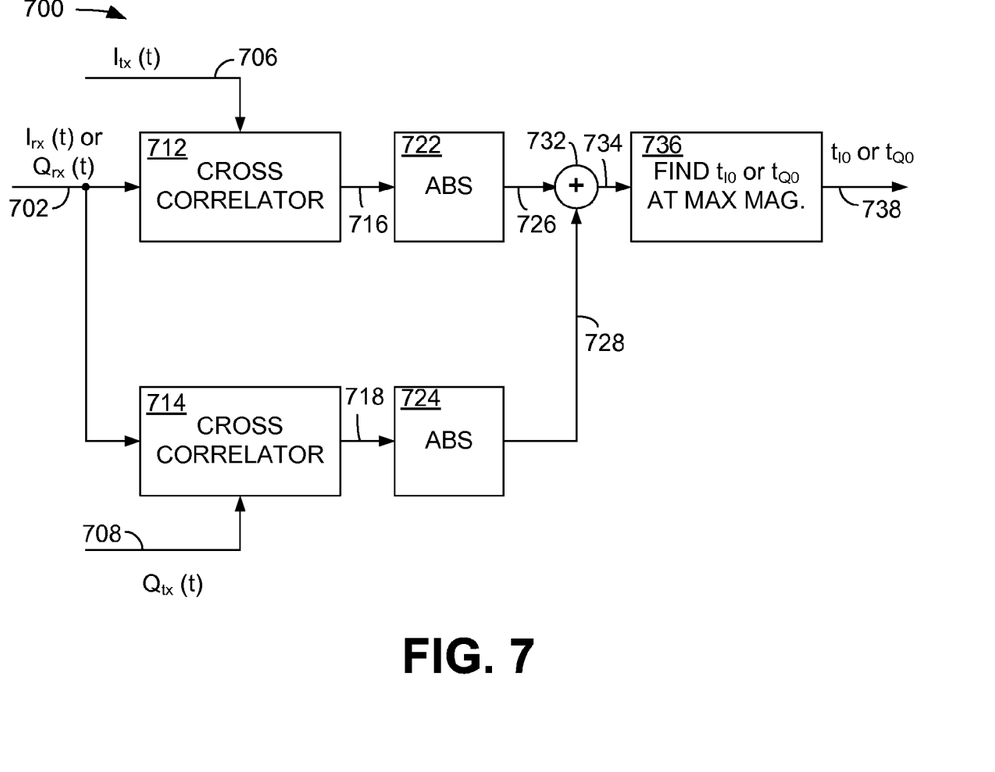
FIG. 7 is a schematic diagram illustrating an example of the operation of the start time determination module described above in FIGS. 5 and 6.

FIG. 7 is a schematic diagram illustrating an example of the operation of the start time determination module described above in FIGS. 5 and 6. The start time determination module 700 includes a cross correlator 712 and a cross correlator 714. The receive signal, $I_{rx}(t)$ or the receive signal $Q_{rx}(t)$, is supplied to the cross correlator 712 and the cross correlator 714 via connection 702.

The reference signal, $I_{tx}(t)$ is supplied to the cross correlator 712 via connection 706 and the reference signal, $Q_{tx}(t)$, is supplied to the cross correlator 714 via connection 708. The cross correlator 712 calculates and outputs the value of $[I_{rx}(t-t_0) * I_{rx}(t)]$ or $[I_{rx}(t-t_0) * Q_{rx}(t)]$. The cross correlator 714 calculates and outputs the value of $[Q_{rx}(t-t_0) * I_{rx}(t)]$ or $[Q_{rx}(t-t_0) * Q_{rx}(t)]$ for different values of $t_0$.

The output of the cross correlator 712 is supplied via connection 716 to the absolute value module 722. The output of the cross correlator 714 is supplied via connection 718 to the absolute value module 724. The absolute value modules 722 and 724 provide as an output the absolute values of their inputs.

The output of the absolute value module 722 is provided to the adder 732 via connection 726 and the output of the absolute value module 724 is provided to the adder 732 via connection 728. The output of the adder on connection 734 is supplied to a module 736 that determines the maximum magnitude of the signals $t_{I0}$ and $t_{Q0}$. In block 736, the value of to that makes $(abs[I_{rx}(t-t_0) * I_{rx}(t)] + abs[Q_{rx}(t-t_0) * I_{rx}(t)])$ or $(abs[I_{rx}(t-t_0) * Q_{rx}(t)] + abs[Q_{rx}(t-t_0) * Q_{rx}(t)])$ achieve its maximum is selected as its output.

Figure 8:
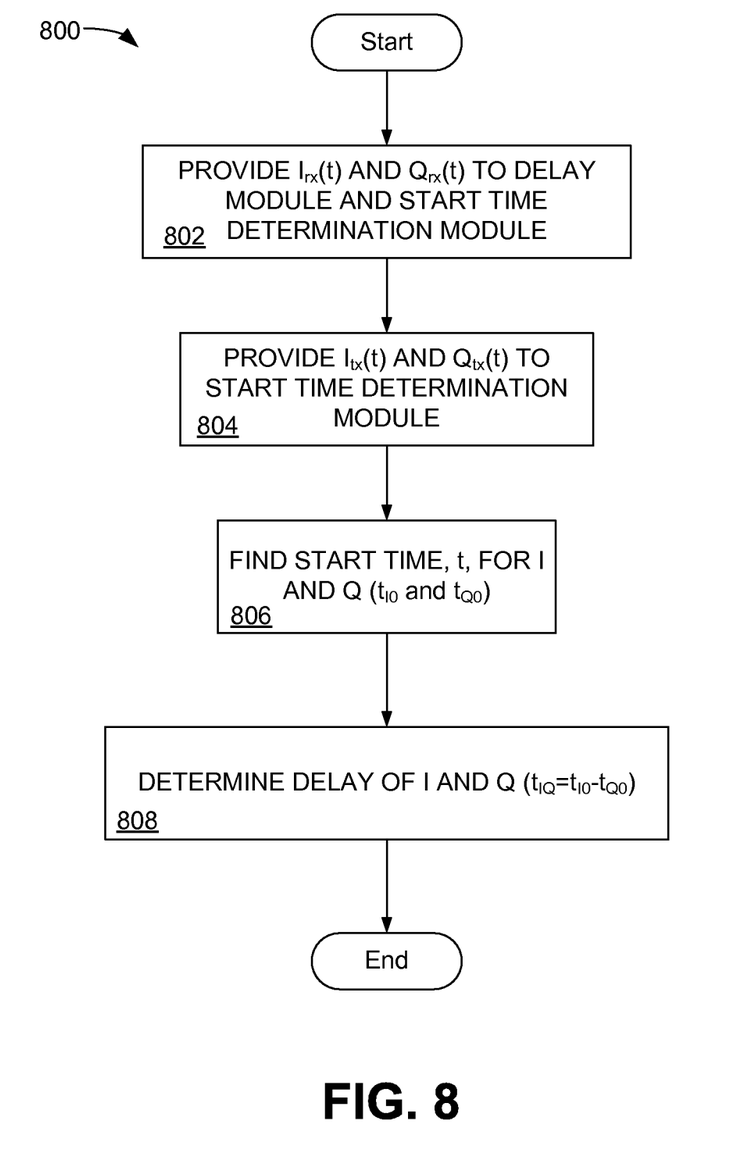
FIG. 8 is a flowchart showing the operation of an embodiment of the system and method for in-phase/quadrature-phase (I/Q) time delay measurement of FIG. 5.

FIG. 8 is a flowchart showing the operation of an embodiment of the system and method for in-phase/quadrature-phase (I/Q) time delay measurement of FIG. 5.

In block 802, the receive signals $I_{rx}(t)$ and $Q_{rx}(t)$ are provided to the delay modules 514 and 516 and the start time determination modules 512 and 518 of FIG. 5. In block 804, the reference signals $I_{tx}(t)$ and $Q_{tx}(t)$ are provided to the start time determination modules 512 and 518 of FIG. 5.

In block 806, the start time, t, for the in-phase ($t_{I0}$) and quadrature-phase ($t_{Q0}$) components is found. In block 808, the delay of the in-phase and quadrature-phase components is found as $t_{IQ} = t_{I0} - t_{Q0}$.

Figure 9:
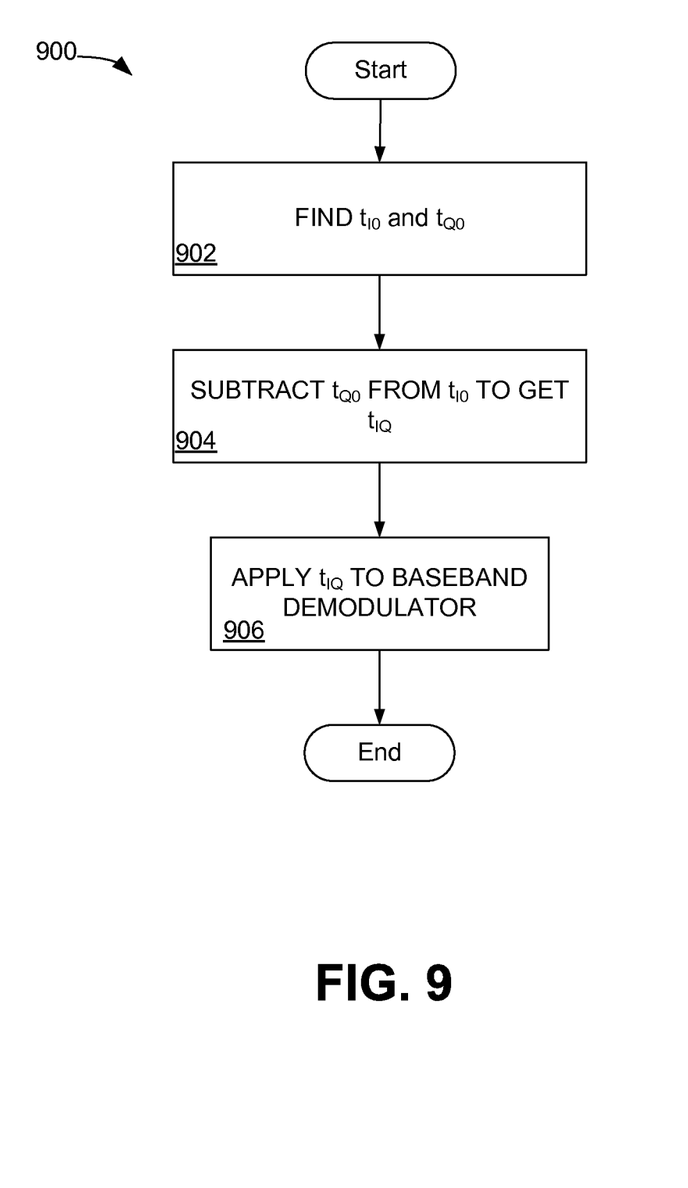
FIG. 9 is a flowchart showing the operation of an embodiment of the system and method for in-phase/quadrature-phase (I/Q) time delay measurement of FIG. 6.

FIG. 9 is a flowchart showing the operation of an embodiment of the system and method for in-phase/quadrature-phase (I/Q) time delay measurement of FIG. 6.

In block 902, the delay times $t_{I0}$ and $t_{Q0}$ are determined by the start time determination modules 608 and 612, respectively. In block 904, the delay $t_{I0}$ is subtracted from the delay $t_{Q0}$ to obtain the delay $t_{IQ}$. In block 906, the delay $t_{IQ}$ is applied to the baseband demodulator to compensate for the I/Q time delay.

Figure 10:
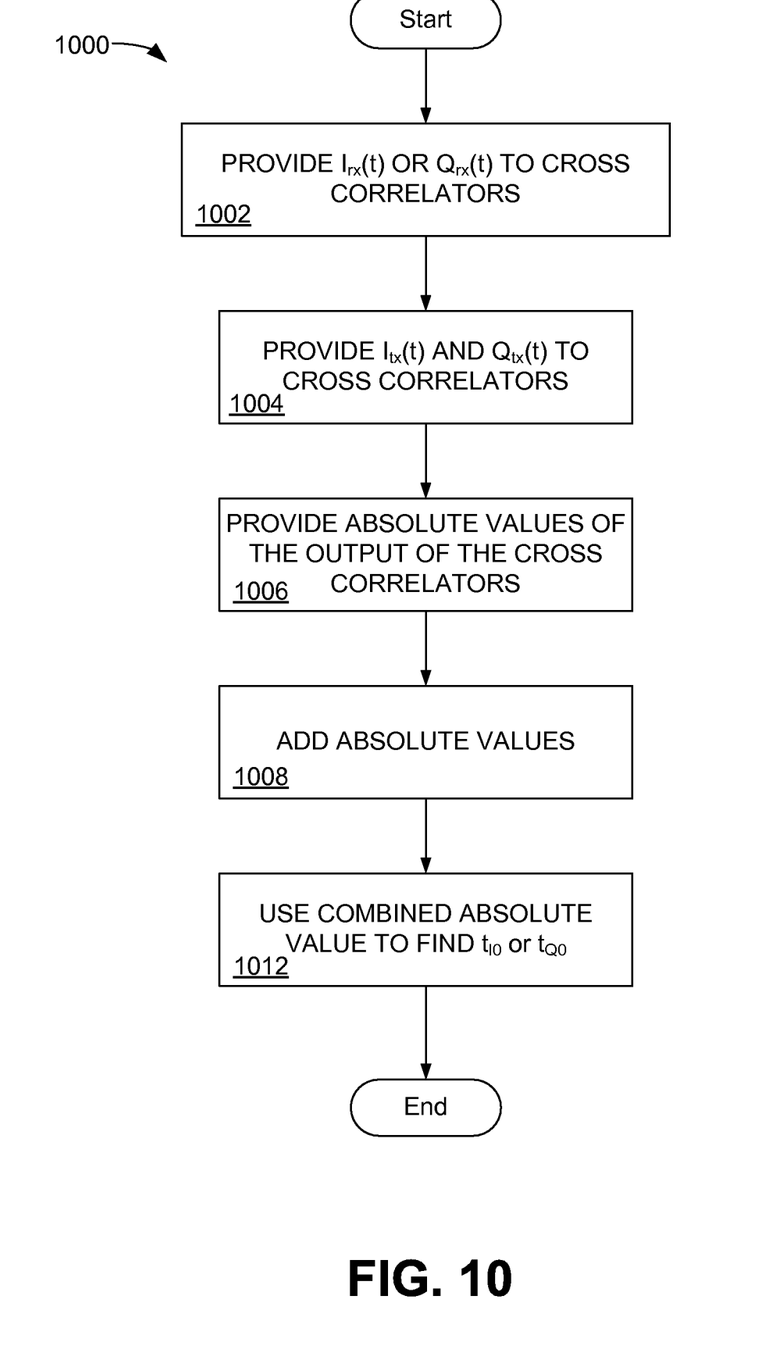
FIG. 10 is a flowchart showing the operation of an embodiment of the start time determination module described in FIG. 7.

FIG. 10 is a flowchart showing the operation of an embodiment of the start time determination module described in FIG. 7. In block 1002, depending on whether the in-phase or the quadrature-phase signal is being processed, either the receive signal $I_{rx}(t)$ or the receive signal $Q_{rx}(t)$ is provided to the cross correlators of FIG. 7. In block 1004, the reference signals $I_{tx}(t)$ and $Q_{tx}(t)$ are provided to the cross correlators 712 and 714, respectively, of FIG. 7. In block 1006, the absolute values of the output of the cross correlators is provided to an adder. In block 1008, the absolute values are added. In block 1012, the combined absolute value is used to find $t_{I0}$ or $t_{Q0}$.

Figure 11:
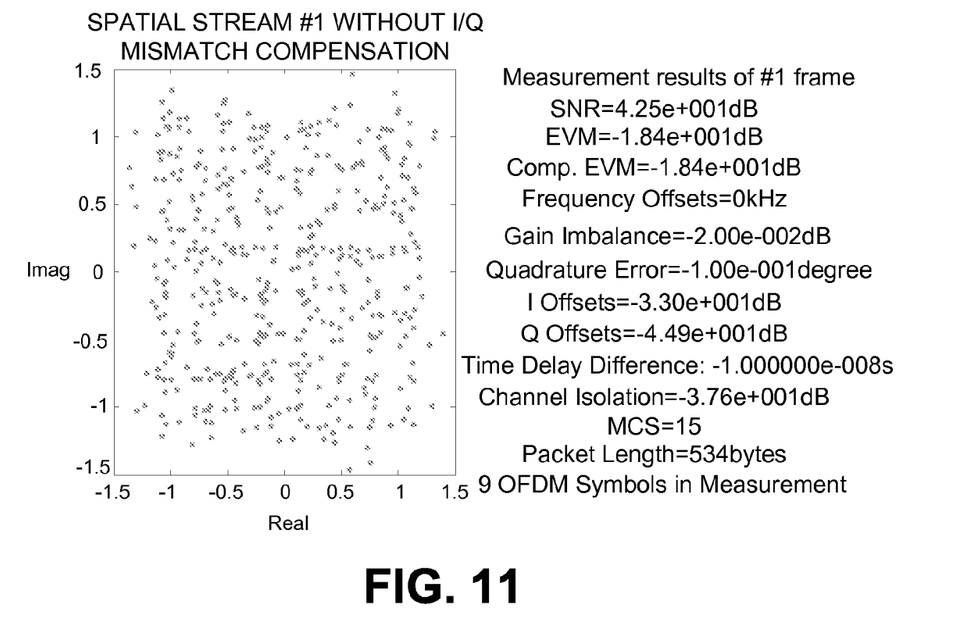
FIG. 11 is a plot illustrating a signal space diagram of a signal received in a conventional receiver.

FIG. 11 is a plot illustrating a signal space diagram of a signal received in a conventional receiver.

Figure 12:
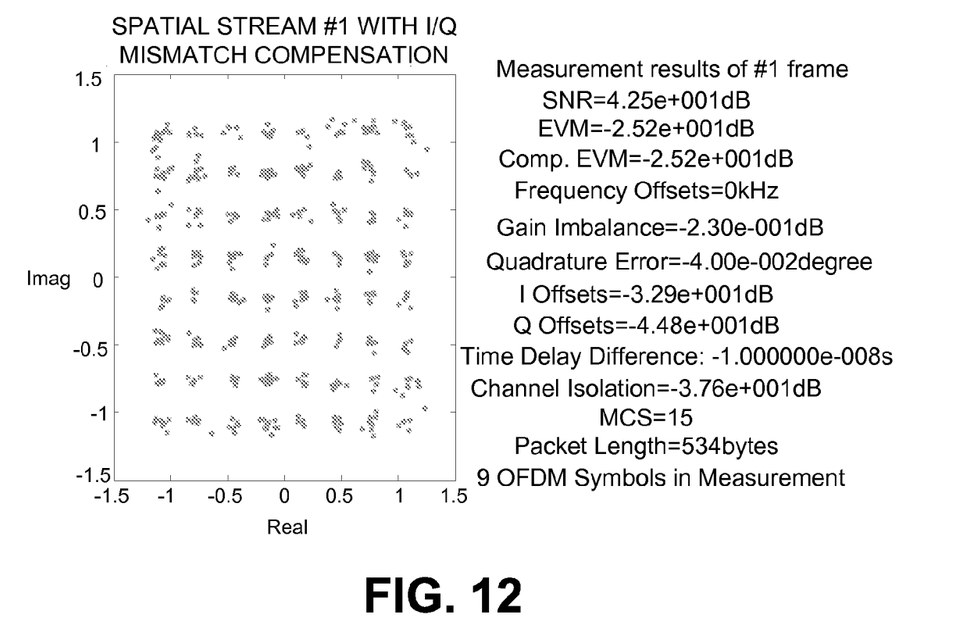
FIG. 12 is a plot illustrating a signal space diagram of a signal received in a receiver including the system and method for in-phase/quadrature-phase (I/Q) time delay measurement and compensation.

FIG. 12 is a plot illustrating a signal space diagram of a signal received in a receiver including the system and method for in-phase/quadrature-phase (I/Q) time delay measurement and compensation. As illustrated by the comparison of FIGS. 11 and 12, the EVM (Error Vector Magnitude) improves after I/Q time delay compensation has been performed based on the measurement results using the system and method for in-phase/quadrature-phase (I/Q) time delay measurement and compensation described above.

The foregoing detailed description has been given for understanding exemplary implementations of the invention and no unnecessary limitations should be understood therefrom as modifications will be obvious to those skilled in the art without departing from the scope of the appended claims and their equivalents.

What is claimed is:

1. A system for determining a time delay between an in-phase signal component and a quadrature-phase signal component, comprising:
    an in-phase signal start time determination module coupled to an in-phase delay module, the in-phase signal start time determination module and the in-phase delay module configured to receive an in-phase signal component of a received signal, and wherein the in-phase signal start time determination module is configured to receive a reference signal;
    a quadrature-phase signal start time determination module coupled to a quadrature-phase delay module, the quadrature-phase signal start time determination module and the quadrature-phase delay module configured to receive a quadrature-phase signal component of a received signal, and wherein the quadrature-phase signal start time determination module is configured to receive a reference signal,
    wherein the in-phase signal start time determination module is configured to develop an in-phase start time signal and the quadrature-phase signal start time determination module is configured to develop a quadrature-phase start time signal; and
    wherein the in-phase delay module develops an in-phase delay signal representative of a delay of the in-phase signal component of the received signal and wherein the quadrature-phase delay module develops a quadrature-phase delay signal representative of a delay of the quadrature-phase signal component of the received signal.

2. The system of claim 1, wherein the reference signal comprises a saved portion of a transmit signal.

3. The system of claim 1, wherein the reference signal is a generated test signal.

4. The system of claim 1, wherein the reference signal comprises an in-phase component and a quadrature-phase component.

5. The system of claim 1, in which the system is implemented in a synchronizer of a receiver.

6. The system of claim 1, further comprising using the in-phase delay signal to compensate for the delay of the in-phase signal component of the received signal and using the quadrature-phase delay signal to compensate for delay in the quadrature-phase signal component of the received signal.

7. A system for determining and compensating a time delay between an in-phase signal component and a quadrature-phase signal component, comprising:
    an in-phase signal start time determination module configured to receive an in-phase signal component of a received signal, and wherein the in-phase signal start time determination module is configured to receive a reference signal;
    a quadrature-phase signal start time determination module configured to receive a quadrature-phase signal component of a received signal, and wherein the quadrature-phase signal start time determination module is configured to receive the reference signal,
    wherein the in-phase signal start time determination module is configured to develop an in-phase start time signal and the quadrature-phase signal start time determination module is configured to develop a quadrature-phase start time signal;
    a subtractor configured to subtract the quadrature-phase start time signal from the in-phase start time signal to develop a net delay signal, wherein the net delay signal is applied to a baseband demodulator to compensate for received signal delay.

8. The system of claim 7, wherein the reference signal comprises a saved portion of a transmit signal.

9. The system of claim 7, wherein the reference signal is a generated test signal.

10. The system of claim 7, wherein the reference signal comprises an in-phase component and a quadrature-phase component.

11. The system of claim 7, in which the in-phase signal start time determination module further comprises:
    first and second cross correlators configured to receive the in-phase signal component of the received signal, the first cross correlator configured to receive an in-phase reference signal, the second cross correlator configured to receive a quadrature-phase reference signal;
    a first absolute value module configured to receive an output of the first cross correlator;
    a second absolute value module configured to receive an output of the second cross correlator;
    an adder configured to combine an output of the first cross correlator with an output of the second cross correlator; and
    a magnitude determination module configured to determine the maximum magnitude of the in-phase delay signal and the quadrature-phase delay signal.

12. A method for determining a time delay between an in-phase signal component and a quadrature-phase signal component, comprising:
    providing an in-phase signal component of a received signal to an in-phase signal start time determination module and to an in-phase delay module;
    providing a reference signal to the in-phase signal start time determination module;
    providing a quadrature-phase signal component of a received signal to a quadrature-phase signal start time determination module and to a quadrature-phase delay module;
    providing the reference signal to the quadrature-phase signal start time determination module;
    developing an in-phase start time and a quadrature-phase start time; and
    determining an in-phase delay signal representative of a delay of the in-phase signal component of the received signal and determining a quadrature-phase delay signal representative of a delay of the quadrature-phase signal component of the received signal responsive to the in-phase start time and the quadrature-phase start time.

13. The method of claim 12, wherein the reference signal comprises a saved portion of a transmit signal.

14. The method of claim 12, wherein the reference signal is a generated test signal.

15. The method of claim 12, wherein the reference signal comprises an in-phase component and a quadrature-phase component.

16. The method of claim 12, in which the system is implemented in a synchronizer of a receiver.

17. The method of claim 12, further comprising:
    using the in-phase delay signal to compensate for the delay of the in-phase signal component of the received signal; and
    using the quadrature-phase delay signal to compensate for delay in the quadrature-phase signal component of the received signal.

18. A system for determining a time delay between an in-phase signal component and a quadrature-phase signal component, comprising:

an in-phase signal start time determination module coupled to an in-phase delay module, the in-phase signal start time determination module and the in-phase delay module configured to receive an in-phase signal component of a received signal, and wherein the in-phase signal start time determination module is configured to receive a reference signal;

a quadrature-phase signal start time determination module coupled to a quadrature-phase delay module, the quadrature-phase signal start time determination module and the quadrature-phase delay module configured to receive a quadrature-phase signal component of a received signal, and wherein the quadrature-phase signal start time determination module is configured to receive a reference signal, wherein the in-phase signal start time determination module and the quadrature-phase signal start time determination module further comprise:

first and second cross correlators configured to receive the in-phase signal component of the received signal, the first cross correlator configured to receive an in-phase reference signal, the second cross correlator configured to receive a quadrature-phase reference signal; a first absolute value module configured to receive an output of the first cross correlator; a second absolute value module configured to receive an output of the second cross correlator; an adder configured to combine an output of the first cross correlator with an output of the second cross correlator; and a magnitude determination module configured to determine the maximum magnitude of the in-phase delay signal and the quadrature-phase delay signal;

wherein the in-phase signal start time determination module is configured to develop an in-phase start time signal and the quadrature-phase signal start time determination module is configured to develop a quadrature-phase start time signal; and wherein the in-phase delay module develops an in-phase delay signal representative of a delay of the in-phase signal component of the received signal and wherein the quadrature-phase delay module develops a quadrature-phase delay signal representative of a delay of the quadrature-phase signal component of the received signal.

\* \* \* \* \*